May 27, 1924.
G. RIVETTA
1,495,357
CAMERA FINDER
Filed Feb. 17, 1923
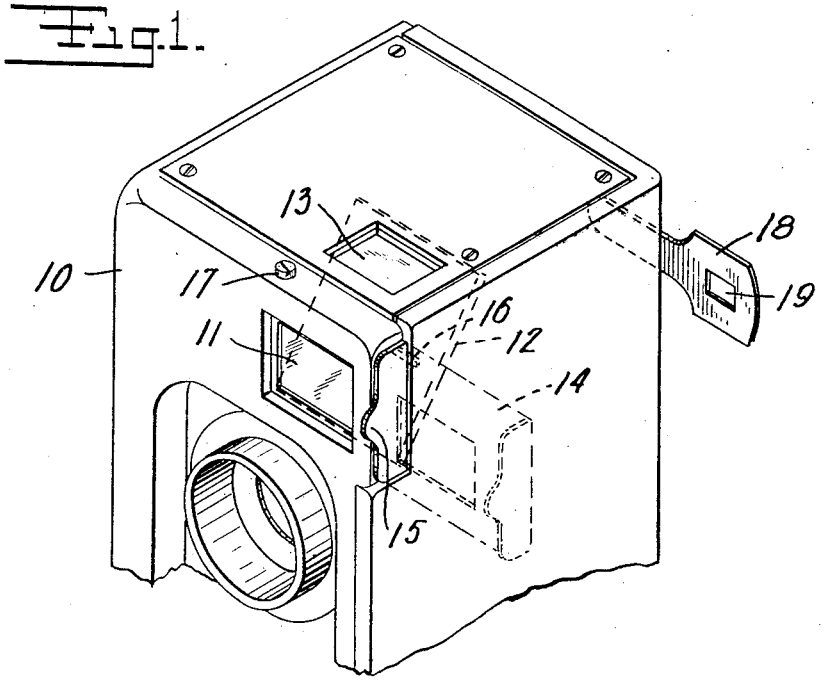
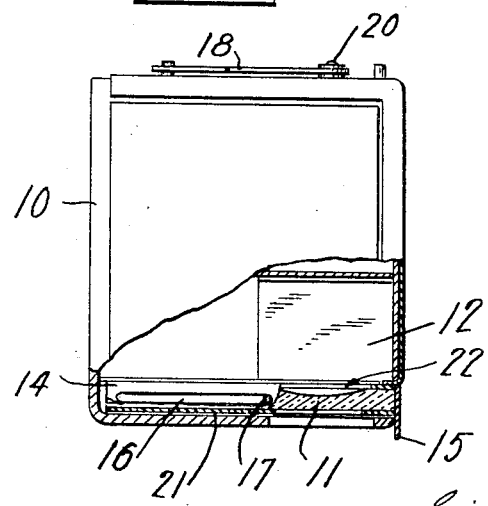
Inventor
Giovanni Rivetta
By his Attorneys
Sifford, Bull & Scull Patented May 27, 1924.

1,495,357

UNITED STATES PATENT OFFICE.

GIOVANNI RIVETTA, OF PARIS, FRANCE, ASSIGNOR TO SEPT CINEMA CAMERA DISTRIBUTORS, INC., OF NEW YORK, N. Y., A CORPORATION OF NEW YORK.

CAMERA FINDER.

Application filed February 17, 1923. Serial No. 619,544.

*To all whom it may concern:*

Be it known that I, GIOVANNI RIVETTA, a subject of the King of Italy, and residing at Avenue Klaber 86, Paris, France, have invented certain new and useful Improvements in Camera Finders, of which the following is a specification.

My present invention relates to a combined reflecting and direct-view finder for use in connection with cameras, particularly of motion picture cameras.

My invention will be best understood from the following description and the annexed drawing, in which Fig. 1 is a perspective of a camera box showing my invention applied thereto, and Fig. 2 is a section through a finder lens and its slide.

Like reference characters indicate like parts in the different views.

Referring now to the drawing, 10 is a camera box which may be of any desired form and in the instant case is shown as a box of a motion picture camera which is provided as usual with a photographic lens and mechanism for moving a film past the lens. Substantially entirely within the boundaries of the camera box, I place a reflecting finder of the usual type having a lens 11, an angularly disposed mirror 12 and a field glass 13, all of the usual and well-known form. The lens 11 is mounted in a slide 14 supported in the mirror and provided with a finger projection 15. The slide preferably is provided with a slot 16 cooperating with a pin 17 connected to the support for the slide 14 to limit the motion thereof.

At the back of the camera box I pivotally support an eye-piece 18 having an opening 19, the eye-piece being pivoted at 20, so that it may be turned from the position shown in Fig. 2 to the full line position shown in Fig. 1.

With the parts in the position shown in Fig. 2, the eye-piece 18 is close against the camera box, so that it is not liable to be broken off and the lens 11 is positioned in proper relation to the mirror 12 and the field 13 so that the finder may be used as a reflecting finder in the well-known manner. For certain work, however, especially in connection with the taking of motion pictures, it is desirable to have a direct-view finder, and such a finder may be obtained by swinging the eye-piece 18 to the full line position of Fig. 1, and, at the same time, sliding the lens 11 to the dotted line position shown in that figure. When so positioned, the operator may use the lens 11 and the opening 19 of the eye-piece 18 as a direct-view finder, the lens 11 being formed in accordance with the distance of the eye-piece 18 and the lens, so that the scene viewed through the opening 19 will correctly represent a field corresponding to the field of the photographic lens of the camera.

Preferably I provide a shield 21 as a part of the slide 14, which shield will be drawn between the opening 22 between the normal position of the lens 11 and the mirror 12 to clearly indicate to the operator that the reflecting finder cannot be used when the lens 11 is in the dotted line position of Fig. 1. The stop 17 and the slot 16 are so proportioned that when the slide 14 is drawn out until the pin 17 engages with the end of the slot, it will be properly positioned in relation to the opening 19 in the eye-piece 18.

It will be understood that the arrangement which I have shown is merely illustrative and that the embodiment of my invention may be widely varied and that some of the parts may be used without other parts.

I claim:

1. A camera having a reflecting finder, said finder having a lens, an angularly disposed reflecting mirror and a field glass and an eye-piece member mounted on the camera, said lens being movably mounted and adapted to be moved out of operative position in the reflecting finder and into position to cooperate with said eye-piece member to form a direct-view finder.

2. A camera having a reflecting finder comprising a lens slidably mounted on the camera case and a reflecting mirror and a field glass within the case, an eye-piece member movably mounted on the camera case and arranged to be positioned either close to the case or projecting from the side thereof, said lens being adapted to be moved out of operative position in the reflecting finder and into position to cooperate with said eye-piece member to form a direct-view finder therewith.

3. A camera having a reflecting finder comprising a lens, a support therefor slidingly mounted on the camera case, a reflecting mirror and a field piece within the case, an eye-piece member movably mounted on the camera case and arranged to be positioned either close to the case or projecting from the side thereof, said lens support being arranged to be moved to bring the lens out of operative position in the reflecting finder and into position to co-operate with said eye-piece member to form a direct-view finder therewith, said slide having means to close the reflecting finder when the lens is moved out of operative position therewith.

GIOVANNI RIVETTA.